(12) United States Patent (10) Patent No.: US 11,320,251 B2
Hwang (45) Date of Patent: May 3, 2022

(54) SHAPE MEASUREMENT APPARATUS

(71) Applicant: Jae Eun Hwang, Changwon-si (KR)

(72) Inventor: Jae Eun Hwang, Changwon-si (KR)

( * ) Notice: Subject to any disclaimer, the term of this patent is extended or adjusted under 35 U.S.C. 154(b) by 0 days.

(21) Appl. No.: 17/262,733

(22) PCT Filed: Jul. 10, 2019

(86) PCT No.: PCT/KR2019/008492
§ 371 (c)(1),
(2) Date: Jan. 24, 2021

(87) PCT Pub. No.: WO2020/022671
PCT Pub. Date: Jan. 30, 2020

(65) Prior Publication Data
US 2021/0190470 A1 Jun. 24, 2021

(30) Foreign Application Priority Data
Jul. 24, 2018 (KR) .................. 10-2018-0086055

(51) Int. Cl.
*G01B 5/20* (2006.01)
(52) U.S. Cl.
CPC ..................... *G01B 5/20* (2013.01)
(58) Field of Classification Search
CPC ........... G01B 5/20; G01B 5/004; G01B 7/016
See application file for complete search history.

(56) References Cited

U.S. PATENT DOCUMENTS 4,265,022 A * 5/1981 Noguchi ................ G01B 3/008
33/553

4,377,911 A * 3/1983 Iida .......................... G01B 7/28
33/551

(Continued)

FOREIGN PATENT DOCUMENTS

JP 05-340706 A 12/1993
JP 11-055926 A 2/1999

(Continued)

*Primary Examiner* — Yaritza Guadalupe-McCall
(74) *Attorney, Agent, or Firm* — Maschoff Brennan (57) ABSTRACT

The present invention relates to a shape measurement apparatus comprising: a driving body 130; a measurement arm part 110 having a stylus 111 coming into contact with an object to be measured, and an arm 113 for supporting the stylus 111 so that the stylus 111 comes into contact with the object to be measured; a measurement arm support part 120 coupled to an end of the arm 113; a pivot 121 for rotatably supporting the measurement arm support part 120 with respect to the driving body 130; and an actuator part 140 for controlling the measurement arm support part 120 to rotate up and down with respect to the pivot 121 so that the stylus 111 moves along the object to be measured. The actuator part 140 comprises: a casing 141 partitioned into an upper space and a lower space by a partition wall 141a; an arm coupling base 142 for connecting the casing and the measuring arm support part 120; an upper actuator 143 provided in the upper space; and a lower actuator 145 provided in the lower space, wherein the upper actuator and the lower actuator 145 each comprise: magnetic coupling plates 143a, 145a; first magnets 143b, 145b provided in an upper portion of the magnetic coupling plates 143a, 145a; second magnets 143c, 145c provided in a lower portion of the magnetic coupling plates 143a, 145a; and coils 143d, 145d coupled to the arm coupling base 142 and surrounding the magnetic coupling plates 143a, 145a.

3 Claims, 7 Drawing Sheets

(56) References Cited

U.S. PATENT DOCUMENTS

| | | | | |
|---|---|---|---|---|
| 6,295,866 B1* | 10/2001 | Yamamoto | ............. | G01B 3/008 |
| | | | | 33/501.04 |
| 9,285,201 B2* | 3/2016 | Matsumiya | ............... | G01B 5/20 |
| 9,829,303 B2* | 11/2017 | Yamauchi | ................ | G01B 5/00 |
| 10,571,238 B2* | 2/2020 | Morii | ..................... | G01B 3/008 |
| 10,900,765 B2* | 1/2021 | Shimaoka | ................ | G01B 7/34 |
| 11,085,752 B2* | 8/2021 | Nakayama | ............. | G01B 3/008 |
| 2014/0237834 A1* | 8/2014 | Matsumiya | .............. | G01B 5/28 |
| | | | | 33/503 |
| 2017/0227346 A1* | 8/2017 | Yamauchi | .............. | G01B 5/012 |
| 2019/0170493 A1* | 6/2019 | Shimaoka | ................ | G01B 7/34 |
| 2019/0360793 A1* | 11/2019 | Morii | ....................... | G01B 5/28 |
| 2020/0132428 A1* | 4/2020 | Nakayama | ............. | G01B 3/008 |
| 2020/0370875 A1* | 11/2020 | Hwang | .................. | G01B 5/016 |
| 2021/0190470 A1* | 6/2021 | Hwang | .................. | G01B 5/20 |
| 2021/0285751 A1* | 9/2021 | Morii | ................... | G01B 21/042 |

FOREIGN PATENT DOCUMENTS

| | | |
|---|---|---|
| JP | 2011-089830 A | 5/2011 |
| KR | 10-1217217 B1 | 12/2012 |
| KR | 10-1626322 B1 | 6/2016 |

\* cited by examiner

SHAPE MEASUREMENT APPARATUS

FIELD OF INVENTION

The present invention relates to a shape measuring device, and more particularly, a shape measurement apparatus with improved structure in that an actuator prevents breakage of a stylus and allows stable movement when measuring a shape of a sharp-stepped object to be measured.

BACKGROUND OF INVENTION

A shape measuring device is an apparatus that obtains shape information of a target object in the form of two-dimensional spatial coordinates by measuring the shape of an object quickly and accurately. The shape measuring device is used to evaluate process accuracy by comparing shape measurement results of processed products or parts with designed shape dimensions, or is used for reverse designing and engineering of a product without design data such as drawings.

An example of such a shape measuring device has been disclosed in Korean Patent No. 10-1217217, entitled "Automatic calibration device to compensate measuring force of a contact type surface shape measuring device."

Figure 1:
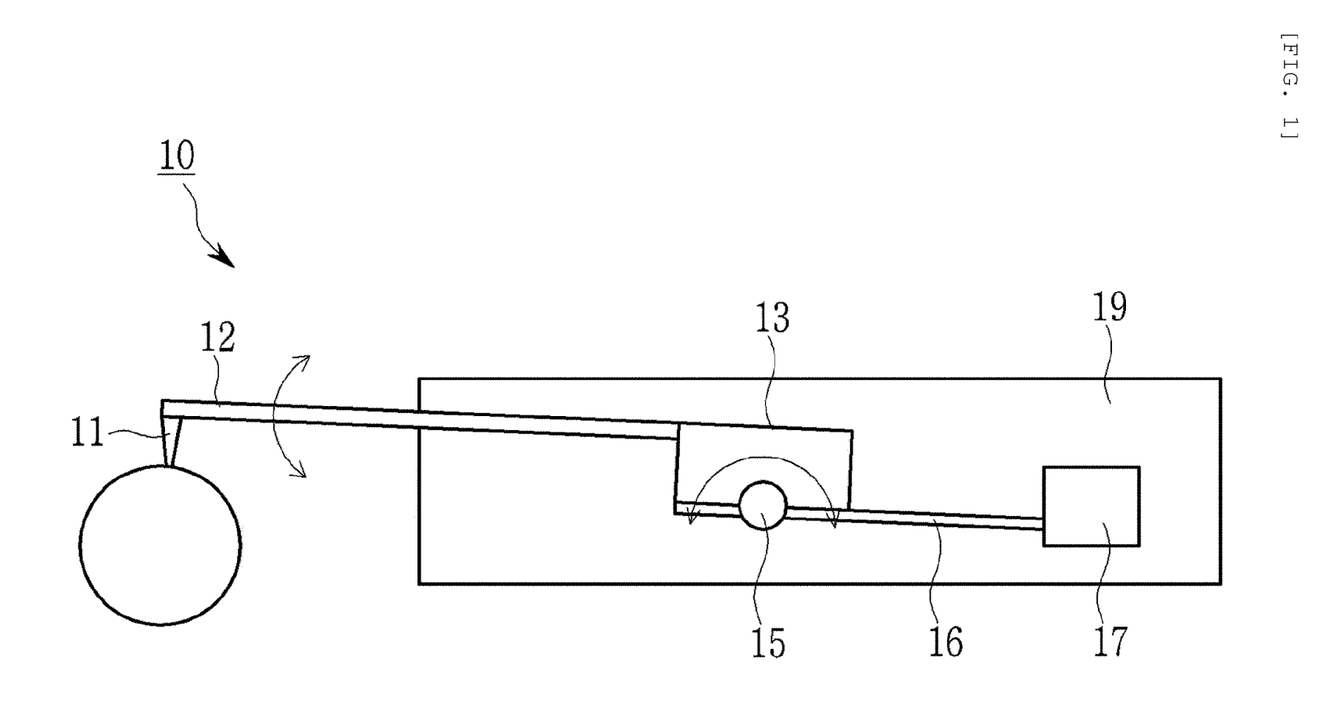
FIG. 1 is a schematic diagram illustrating a configuration of the conventional shape measuring device.

FIG. 1 is a schematic diagram illustrating an example of the conventional shape measuring device 10. As shown, the conventional shape measuring device 10 is provided with a stylus 11 at the end of an arm 12, wherein the arm 12 is coupled to a measuring arm support 13. The measuring arm support 13 is coupled to a driving body 19 by a pivot 15, and an actuator 17 is coupled to the measuring arm support 13 through a base plate 16.

Figure 2:
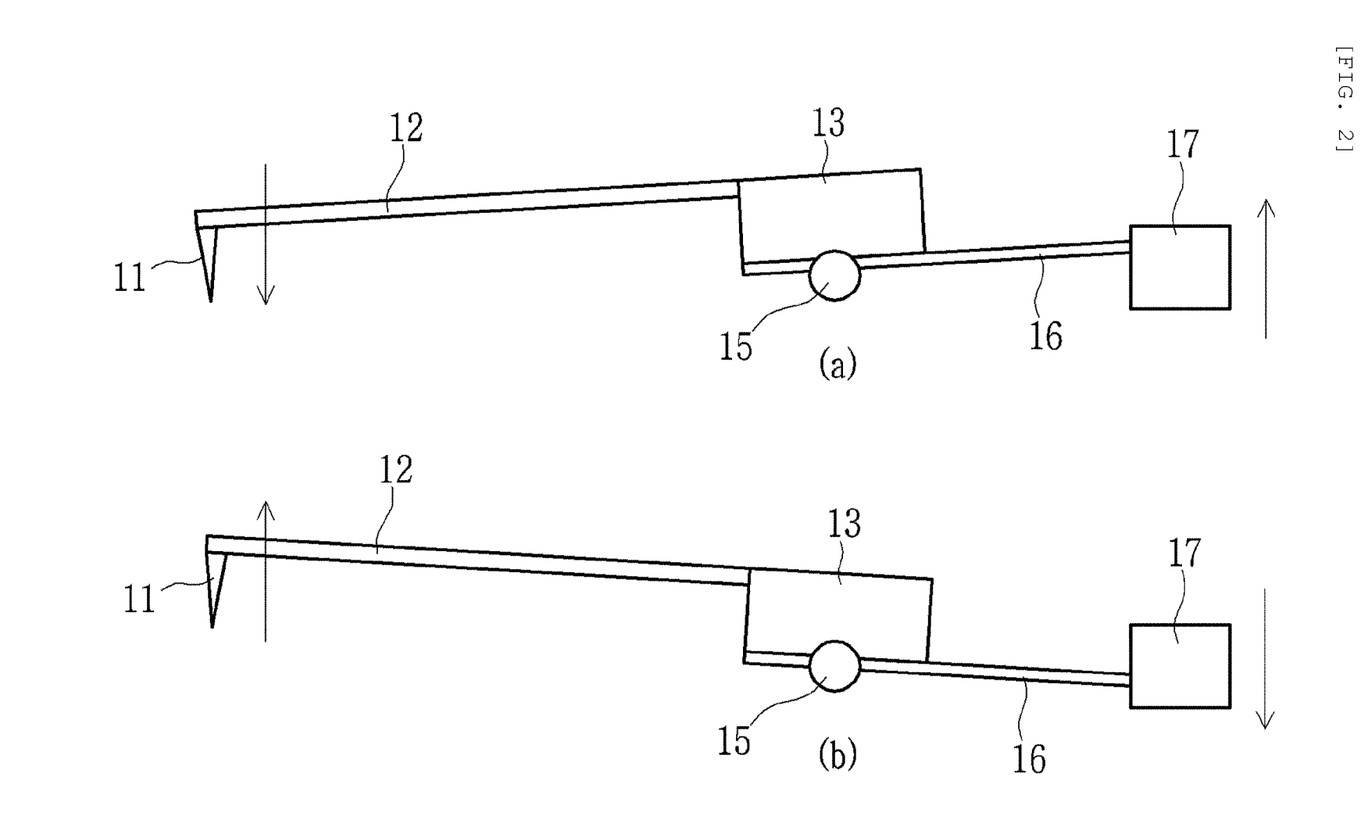
FIG. 2 is a schematic diagram illustrating an operation process of the conventional shape measuring device.

In the conventional shape measuring device 10, as shown in FIG. 2A, the stylus 11 moves downward about the pivot 15 by a force of the actuator 17. Alternatively, as shown in FIG. 2B, the stylus 11 moves upward about the pivot 15 by the force of the actuator 17, so that the actuator 17 can move along the stylus 11 and the surface of an object A to be measured.

Figure 3:
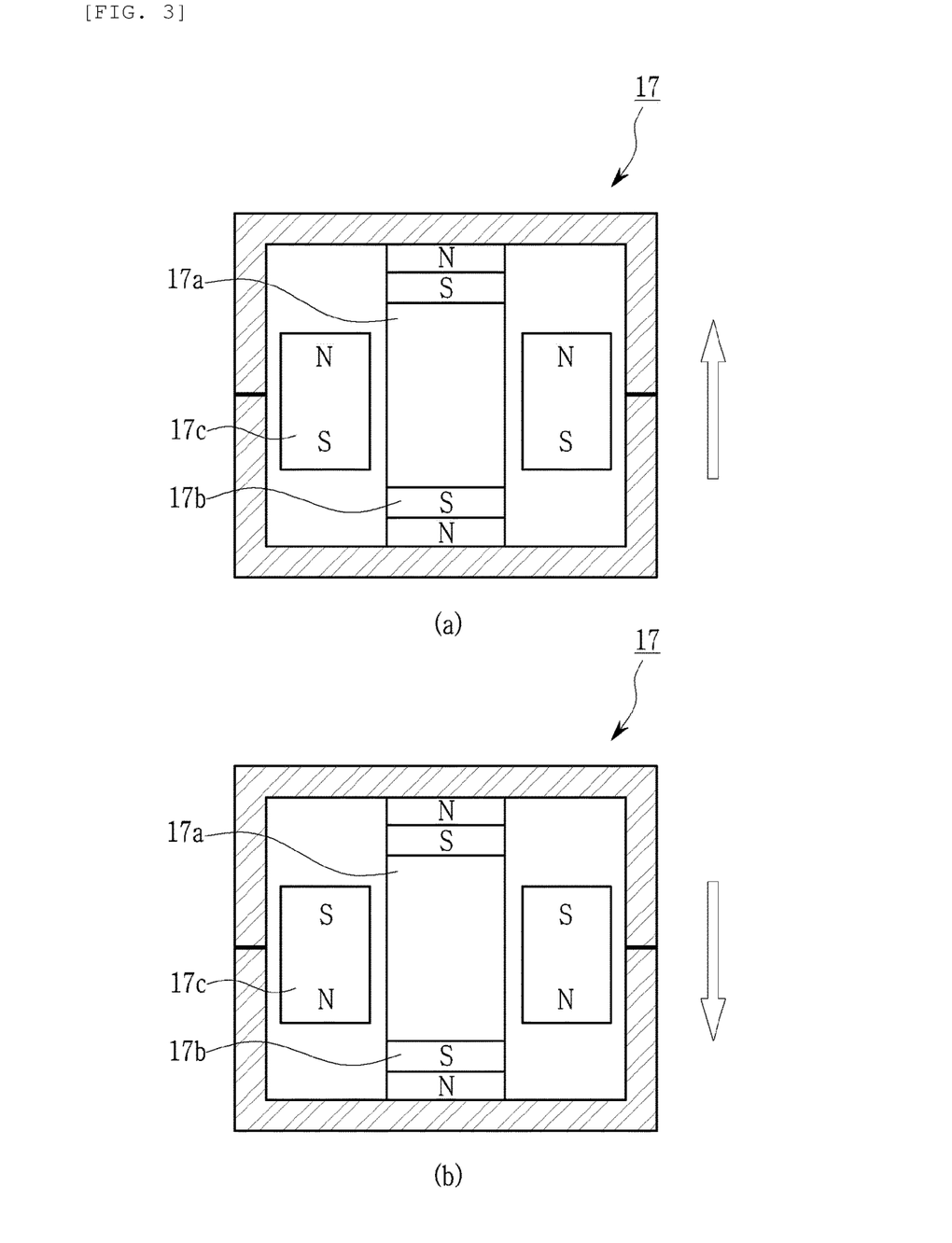
FIG. 3 is an exemplary view showing a configuration and operation of the actuator in the conventional shape measuring device.

FIG. 3 is an exemplary view showing a configuration and an operation process of the actuator 17 in the conventional shape measuring device 10. As shown in FIG. 3A, the shape measuring device 10 includes a magnet 17b above and below the support plate 17a, as well as a coil 17c to surround the outside of the support plate 17a. When current is applied in clockwise direction to the coil 17c in this state, the coil 17c moves upward. The base plate 16 is coupled to the coil 17c and, when the base plate 16 moves upward, the stylus 11 is directed downward about the pivot 15.

Conversely, when current is applied to the coil 17c in the counterclockwise direction as shown in FIG. 3B, the coil 17c moves downward and the stylus 11 moves upward.

In other words, the conventional actuator 17 adjusts a direction of the stylus 11 by changing a direction of the current flowing around the coil 17c using one coil 17c, and adjusts an intensity of the current flowing around the coil 17c, thereby controlling the measuring force.

Figure 4:
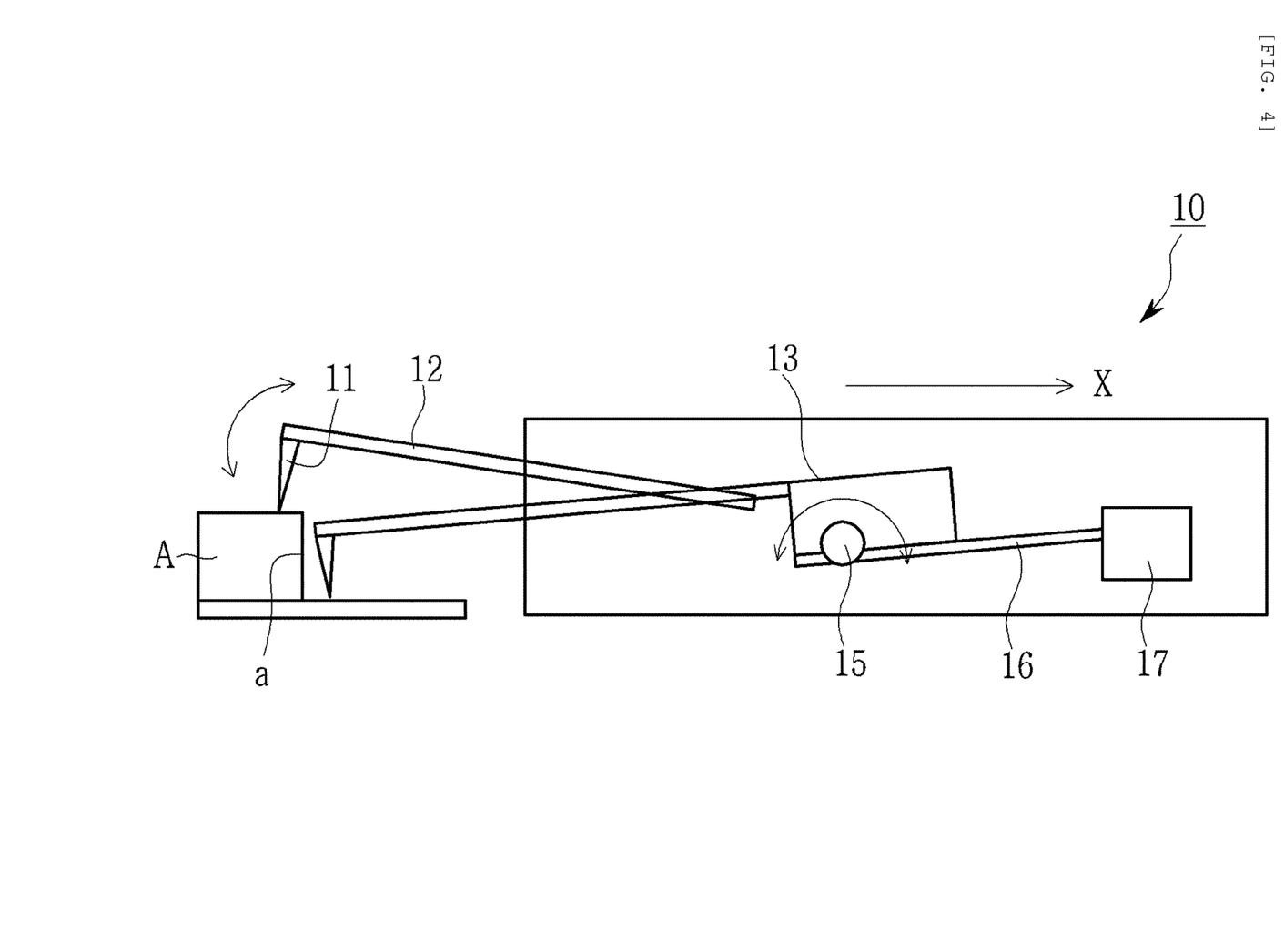
FIG. 4 is an exemplary view showing movement of the conventional measuring device on a stepped face of a target object.

However, as shown in FIG. 4, when the measuring force is controlled to act downward and then surface measurement of an object A is conducted on the X-axis, there is a problem in that the stylus 11 falls down upon encountering a stepped face (a) of the object A. In this case, an end portion of the stylus 11 is easy to break.

The breakage occurs because the current direction of the coil 17c cannot be differentiated suddenly (or rapidly) to prevent breakage when current flow of the coil 17c is controlled to direct the measuring force downward. If the current direction of the coil 17c is suddenly differentiated, the arm 12 is severely moved up and down like a seesaw.

In addition, the conventional actuator 17 using one coil 17c adopts PID control for precise motion control. In particular, when D control (differential control) is performed, a resonance sound is generated due to vibration of coil 17c. In some cases, disturbance of the arm 12 may cause an abnormal phenomenon of shaking the arm 12 at the boundary point at which the current direction of the coil 17c is differentiated. This may cause an error in measurement or break the end of the stylus 11 due to shaking of the arm 12.

SUMMARY OF INVENTION

Technical Problem to be Solved

The present invention has been proposed to solve the above problems, and it is an object of the present invention to provide a shape measuring device that can prevent falling of a stylus at a stepped face of an object to be measured while enabling stable measurement.

The above object and various advantages of the present invention will become more apparent from preferred embodiments of the present invention by those skilled in the art.

Technical Solution

The objects of the present invention may be accomplished by a shape measurement apparatus. The shape measurement apparatus of the present invention may include: a driving body 130; a measuring arm member ("arm member") 110 which has a stylus 111 coming into contact with an object to be measured ("target object") and an arm 113 to support the stylus 111, thereby enabling the stylus to be in contact with the target object; a measuring arm support member ("support member") 120 coupled to an end of the arm 113; a pivot 121 to rotatably support the support member 120 with respect to the driving body 130; and an actuator unit 140 for adjusting the support member 120 to rotate up and down with respect to the pivot 121 so that the stylus 111 is controlled to move along the target object, wherein the actuator unit 140 includes: a casing 141 partitioned into an upper space and a lower space by a partition 141a; an arm coupling base 142 to connect the casing 141 and the support member 120; an upper actuator 143 provided in the upper space; and a lower actuator 145 provided in the lower space, wherein the upper actuator 143 and the lower actuator 145 include: magnetic coupling plates 143a and 145a; first magnets 143b and 145b provided on each upper portion of the magnetic coupling plates 143a and 145a; second magnets 143c and 145c provided on each lower portion of the magnetic coupling plates 143a and 145a; and coils 143d and 145d coupled to the arm coupling base 142 while surrounding the magnetic coupling plates 143a and 145a, respectively.

According to one embodiment, the upper actuator 143 and the lower actuator 145 may reverse the direction of current flowing around each of the coils 143d and 145d, respectively, and can differentiate an intensity of the current flowing around each of the coils 143d and 145d, thereby controlling a movement direction and a measuring force of the stylus 111.

According to one embodiment, the upper actuator 143 and the lower actuator 145 may reverse the direction of current flowing around each of the coils 143d and 145d, respectively, and can differentiate an intensity of the current flowing around each of the coils 143d and 145d, thereby controlling a movement direction of the stylus 111.

Effect of Invention

The shape measurement apparatus according to the present invention consists of two actuators configured by dividing the actuator unit up and down. These two actuators may apply current in opposite directions to coils, respectively, and adjust only the applied current value so as to control the movement direction and measuring force of the stylus.

Accordingly, it is possible to solve the conventional problem of damaging the stylus since the stylus is stopped in the air without falling from the stepped face. In addition, sudden differentiate indirection is not required, thus eliminating a problem of seesaw movement of the conventional arm.

DETAILED DESCRIPTION OF PREFERRED EMBODIMENTS OF INVENTION

In order to fully understand the present invention, preferred embodiments of the present invention will be described with reference to the accompanying drawings. Embodiments of the present invention may be modified in various forms, and the scope of the invention should not be construed as being limited to the embodiments described in detail below. The present inventive embodiment is provided to more completely explain the present invention to those skilled in the art. Therefore, the shapes of the elements in the drawings and the like may be exaggerated to provide a clearer description. It should be noted that the same members in each drawing are sometimes indicated by the same reference numerals. Detailed descriptions of well-known functions and configurations that are determined to unnecessarily obscure subject matters of the present invention will be omitted.

Figure 5:
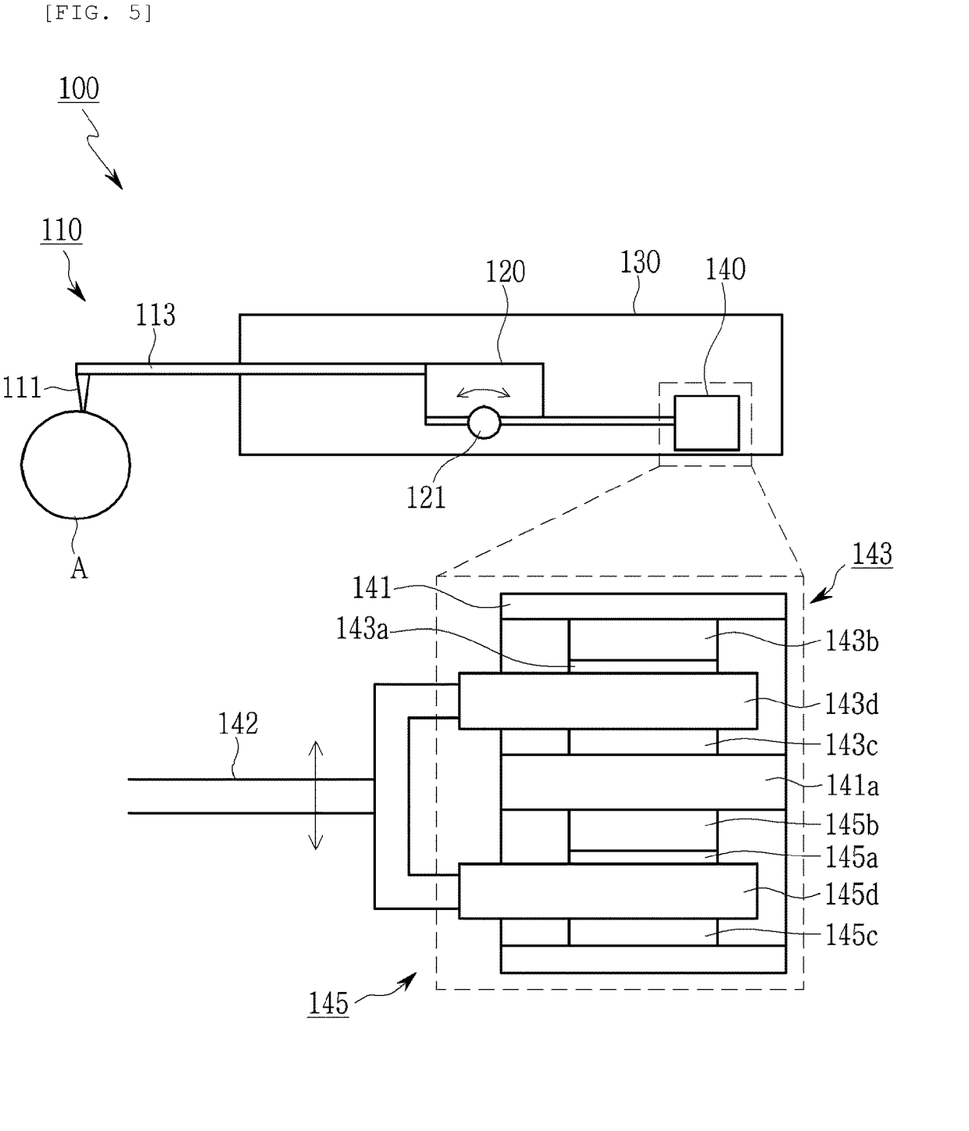
FIG. 5 is a schematic diagram illustrating a configuration of the shape measurement apparatus according to the present invention.

FIG. 5 is a schematic diagram illustrating a configuration of the shape measurement apparatus 100 according to the present invention. As shown in FIG. 5, in the shape measurement apparatus 100 according to the present invention, a stylus 111 coupled to an arm 113 may move along the surface of a target object A to outline a surface shape of the target object A by coordinates.

The shape measurement apparatus 100 according to the present invention may include a measuring arm member 110 coupled to the stylus 111, a measuring arm support member 120 coupled to the arm member 110, a driving body 130 to support the stylus 111 and the support member 120, and an actuator unit 140 coupled to the driving body 130 to apply measuring force so as to move the stylus 111 along the surface of the target object A.

The arm member 110 may include the stylus 111 in contact with the target object A, and the arm 113 to support the stylus 111.

The arm support member 120 may connect the arm member 110 to an arm coupling base 142, a first coil 143d and a second coil 145d, thereby supporting the arm member 110 to move along the surface of the target object A. The support member 120 may be fixedly coupled to the driving body 130. The actuator unit 140 may be coupled to an X-axial driving member (not shown) and a Z-axial driving member (not shown), thereby supporting the arm member 110 to measure a two-dimensional shape of the target object A.

The support member 120 and the driving body 130 may be coupled by a pivot 121. The pivot 121 may be coupled to penetrate through the driving body 130 so that the arm member 110 coupled with the arm 113 can be rotatably supported.

The actuator unit 140 may control the measuring force such that a predetermined measuring force is applied when the stylus 111 moves along the surface of the target object A.

Figure 6:
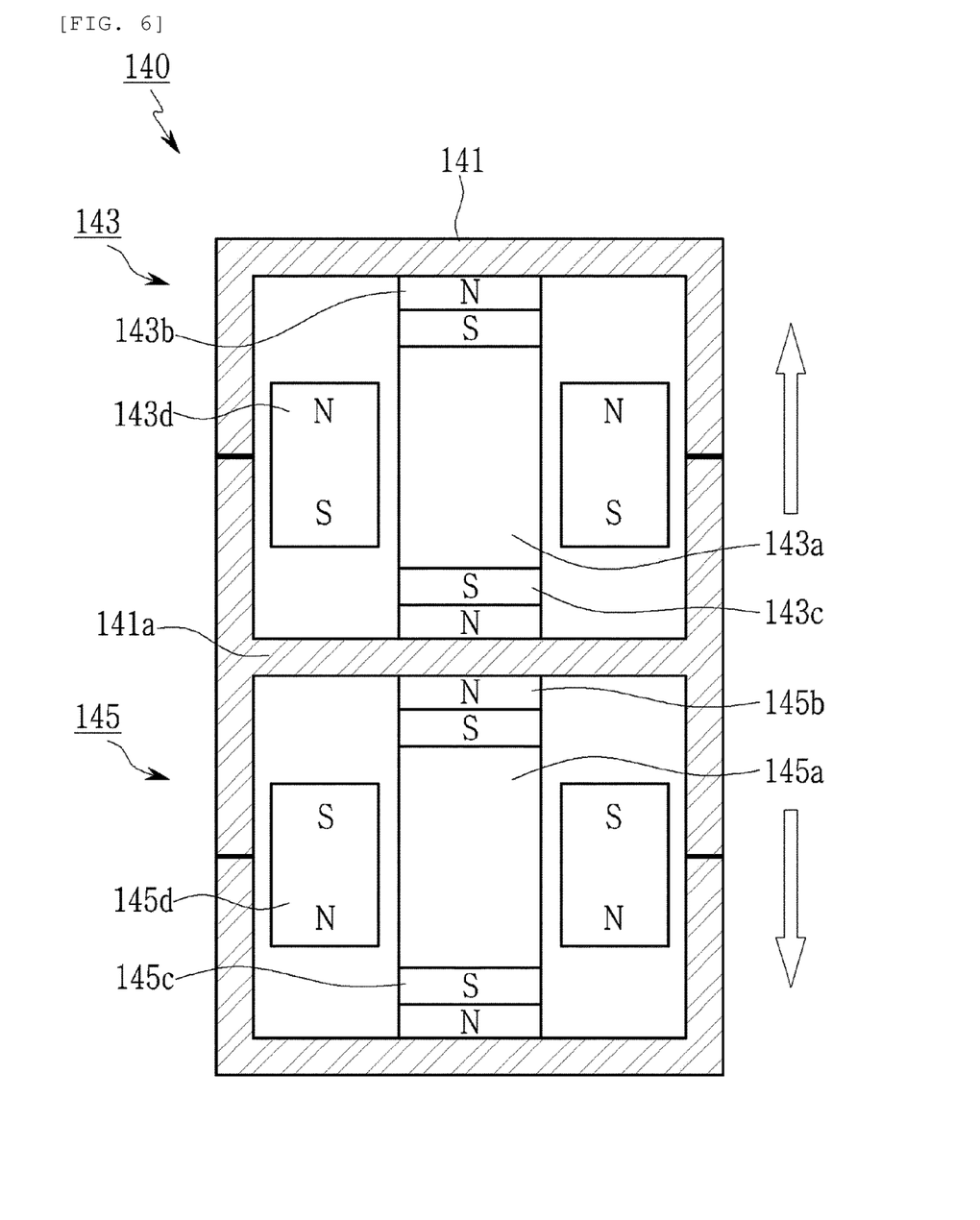
FIG. 6 is a schematic diagram illustrating a configuration of the actuator unit according to the present invention.

FIG. 6 is a cross-sectional schematic diagram illustrating a cross-sectional configuration of the actuator unit 140. As shown in FIGS. 5 and 6, the actuator unit 140 according to the present invention may include a casing 141, as well as an upper actuator 143 and a lower actuator 145 provided inside the casing 141.

The casing 141 may be partitioned up and down by a partition 141a. The upper actuator 143 and the lower actuator 145 may be accommodated in each space partitioned vertically. The upper actuator 143 may include: an upper magnetic coupling plate 143a; an upper first magnet 143b and an upper second magnet 143c disposed above and below the upper magnetic coupling plate 143a, respectively; and a first coil 143d disposed to surround the outside of the upper magnetic coupling plate 143a.

Likewise, the lower actuator 145 may include: a lower magnetic coupling plate 145a; a lower first magnet 145b and a lower second magnet 145c disposed above and below the lower magnetic coupling plate 145a, respectively; and a second coil 145d disposed to surround the outside of the lower magnetic coupling plate 145a.

The first coil 143d and the second coil 145d may be connected to the arm coupling base 142 together. The arm coupling base 142 is coupled to the lower portion of the support member 120 and is further coupled to the pivot 121. The casing 141 is fixedly coupled to the driving body 130, while the first coil 143d and the second coil 145d move up and down in accordance with a direction of current application. The arm coupling base 142 may rotate about the pivot 121 according to each movement direction of the first coil 143d and the second coil 145d, thereby moving the stylus 111 up and down in association with the above movement. Herein, the actuator unit 140 according to the present invention may be provided with the upper actuator 143 and the lower actuator 145 up and down, respectively, to which current is applied in opposite directions. That is, clockwise current is applied to the first coil 143d of the upper actuator 143 while counterclockwise current is applied to the second coil 145d of the lower actuator 145.

As such, when the current is applied in opposite directions, the first coil 143d and the second coil 145d may move in opposite directions. In particular, when the same current is applied in opposite directions, the first coil 143d and the second coil 145d can be positioned in the middle of the casing 141 so that the arm coupling base 142 is horizontally positioned on the pivot 121 and the stylus 111 may also be in a horizontal state.

On the other hand, when an amount of the current flowing around the first coil 143d is smaller than that of the current flowing around the second coil 145d, the first coil 143d and the second coil 145d may move downward together. If the first coil 143d and the second coil 145d move downward, the stylus 111 positioned in the opposite direction to the pivot 121 may move upward.

On the contrary, when an amount of the current flowing around the first coil 143d is larger than that of the current flowing around the second coil 145d, the first coil 143d and the second coil 145d may move upward together. As a result, the stylus 111 may move downward.

In other words, the actuator unit 140 according to the present invention may secure the current directions of the two coils 143d and 145d in opposite directions, while adjusting only an intensity of the current so as to differentiate a direction of the stylus or control a measuring force.

In order to increase the measuring force in the downward direction, a current value of the first coil 143d should be increased. Conversely, in order to increase the measuring force in the upward direction, a current value of the second coil 145d should be increased.

A measurement process of the target object A using the shape measurement apparatus 100 according to the present invention having such a configuration as described above will be described with reference to FIGS. 5 to 7.

Figure 7:
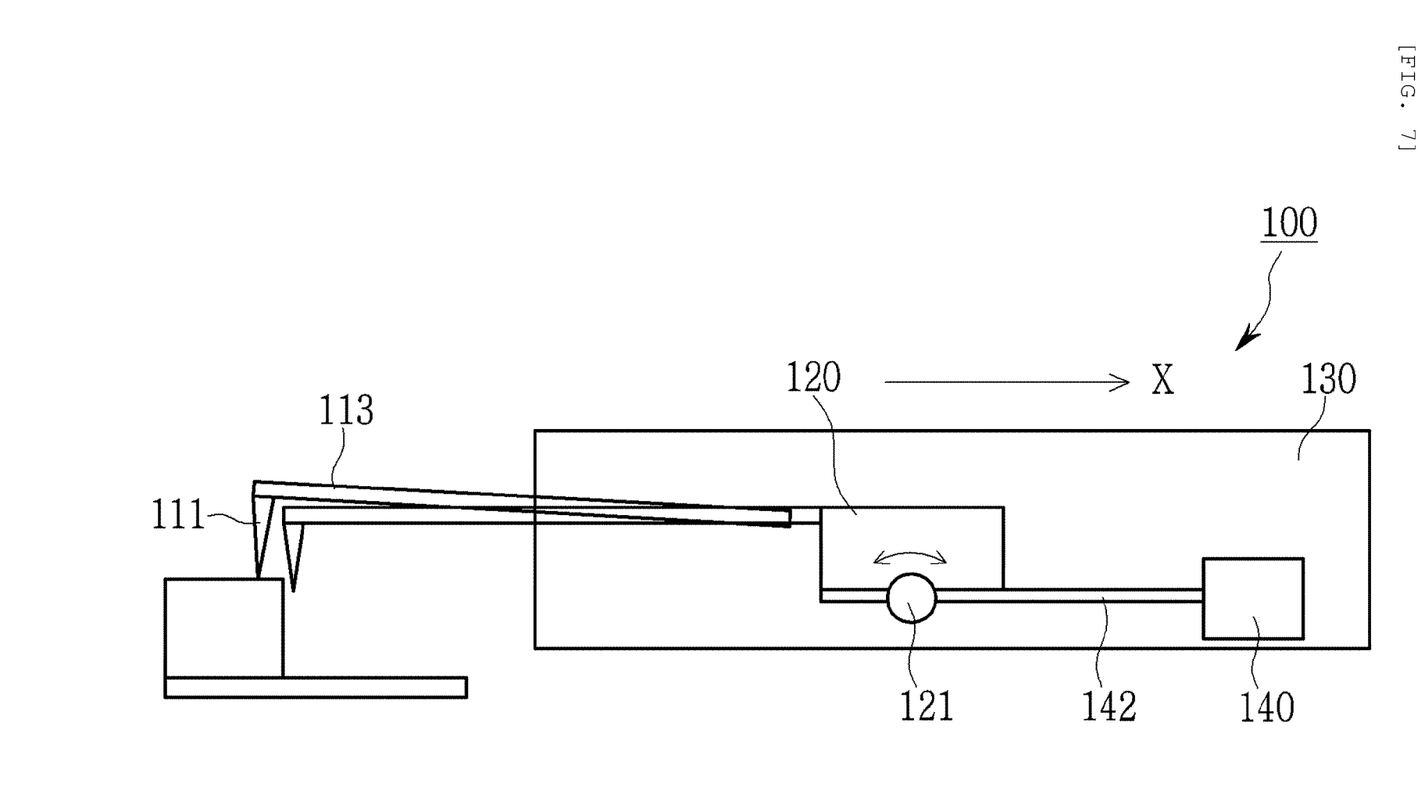
FIG. 7 is an exemplary view showing movement of the shape measurement apparatus according to the present invention on a stepped face of the target object.

As shown in FIG. 7, when the stylus 111 is to be positioned above the target object A, the stylus 111 is disposed in the middle of the casing 141 of the actuator unit 140 by a worker. To this end, the same current should be applied to the first coil 143d and the second coil 145d.

For example, it is illustrated that a current value of 50 is applied to each of the first coil 143d and the second coil 145d. Since the same current is applied in opposite directions, the arm coupling base 142 becomes horizontal with respect to the pivot 121 and the stylus 111 is also in a horizontal state. Then, the horizontal stylus 111 is disposed at a measurement starting position of the target object A.

After disposing the stylus 111 at the measurement starting position, a measuring force should be applied. This is because the stylus 111 can move while being in close contact with the surface of the target object A only when the measuring force is applied. When measuring a rectangular shape of the target object A shown in FIG. 7, a measuring force in a downward direction is applied.

To this end, the worker increases the current amount of the first coil 143d to 70 (without defined unit for measurement) while maintaining the current amount of the second coil 145d to 50. In this case, since the current amount of the first coil 143d is higher by 20 than that of the second coil, a measuring force may be applied in a downward direction by as much as 20 more than the current amount of the second coil 145d.

When the driving body 130 moves in an X-axis direction in this state, the stylus 111 moves along with the above movement and measures the surface of the target object A.

During measurement, when meeting the stepped face, the stylus 111 stops in a state wherein the stylus has moved downward to only a position corresponding to 20 more than the current amount of the second coil 145d.

The conventional shape measuring device 10 shown in FIG. 4 applies a current amount of 50 in order to apply a measuring force in a downward direction to the coil 17c, thereby measuring the target object A. In this case, upon encountering a stepped face, the device moves downward by as much as the current amount of 50 and falls down.

On the contrary, the actuator 140 of the present invention may apply a force in a direction in which the first coil 143d and the second coil 145d act to offset each other, so that the stylus 111 does not fall down but may move only by as much as a difference in current values between both coils and then stop in the air.

Accordingly, it is possible to solve the problem of damage to the stylus due to falling from the stepped face.

As described above, the shape measurement apparatus according to the present invention may include an actuator unit consisting of two actuators partitioned up and down. The two actuators may apply current to coils in opposite directions and control a movement direction and measuring force of the stylus by adjusting only the applied current value.

Accordingly, the stylus stops in the air without falling from a stepped face, thereby overcoming a problem of damage of the stylus. In addition, sudden differentiate in direction is not required, thereby overcoming another problem of seesaw movement of the conventional arm.

The embodiments of the shape measuring apparatus according to the present invention described above are merely exemplary, and those skilled in the art will appreciate that various modifications and other equivalent embodiments are possible there from. Therefore, it will be understood that the present invention is not limited to the forms mentioned in the above detailed description. Accordingly, the real technical scope of the present invention to be protected will be defined by the technical spirit of the appended claims. It is also to be understood that the present invention includes all modifications, equivalents and substitutions within the spirit and scope of the invention as defined by the appended claims.

DESCRIPTION OF REFERENCE NUMERALS

100: Shape measurement apparatus 110: Measuring arm member
111: Stylus 113: Arm
120: Measuring arm support member 121: Pivot
130: Driving body 140: Actuator unit
141: Casing 141a: Bulkhead
142: Arm coupling base 143: Upper actuator
143a: Upper magnetic coupling plate 143b: Upper first magnet
143c: Upper second magnet 143d: First coil
145: Lower actuator 145a: Lower magnetic coupling plate
145b: Lower first magnet 145c: Lower second magnet
145d: Second coil

INDUSTRIAL APPLICABILITY

The shape measurement apparatus according to the present invention can prevent falling and damage of the stylus, while enabling stable measurement.

The invention claimed is:

1. A sharp measurement apparatus, comprising:
a driving body 130;
a measuring arm member ("arm member") 110 which has a stylus 111 coming into contact with an object to be measured ("target object") and an arm 113 to support the stylus 111, thereby enabling the stylus to be in contact with the target object;
a measuring arm support member ("support member") (120) coupled to an end of the arm 113;
a pivot 121 to rotatably support the support member (120) with respect to the driving body 130; and
an actuator unit 140 for adjusting the support member 120 to rotate up and down with respect to the pivot 121 so that the stylus 111 is controlled to move along the target object,
wherein the actuator unit 140 includes:
a casing 141 partitioned into an upper space and a lower space by a partition 141a;
an arm coupling base 142 to connect the casing 141 and the support member 120;
an upper actuator 143 provided in the upper space; and
a lower actuator 145 provided in the lower space,
wherein the upper actuator 143 and the lower actuator 145 include:
magnetic coupling plates 143a and 145a;
first magnets 143b and 145b provided on each upper portion of the magnetic coupling plates 143a and 145a;
second magnets 143c and 145c provided on each lower portion of the magnetic coupling plates 143a and 145a; and
coils 143d and 145d coupled to the arm coupling base 142 while surrounding the magnetic coupling plates 143a and 145a, respectively.

2. The apparatus according to claim 1, wherein the upper actuator 143 and the lower actuator 145 reverse the direction of current flowing around each of the coils 143d and 145d, respectively, and differentiate an intensity of the current flowing around each of the coils 143d and 145d, thereby controlling a movement direction of the stylus 111.

3. The apparatus according claim 2, wherein the upper actuator 143 and the lower actuator 145 reverse the direction of current flowing around each of the coils 143d and 145d, respectively, and differentiate an intensity of the current flowing around each of the coils 143d and 145d, thereby controlling a movement direction and a measuring force of the stylus 111.

* * * * *